United States Patent
Minagawa et al.

(10) Patent No.: US 9,652,850 B2
(45) Date of Patent: May 16, 2017

(54) SUBJECT TRACKING DEVICE AND SUBJECT TRACKING METHOD

(71) Applicant: FUJITSU LIMITED, Kawasaki-shi, Kanagawa (JP)

(72) Inventors: Akihiro Minagawa, Inagi (JP); Yutaka Katsuyama, Yokohama (JP); Hiroaki Takebe, Kawasaki (JP); Yoshinobu Hotta, Kawasaki (JP); Masayoshi Shimizu, Hadano (JP)

(73) Assignee: FUJITSU LIMITED, Kawasaki (JP)

( * ) Notice: Subject to any disclaimer, the term of this patent is extended or adjusted under 35 U.S.C. 154(b) by 627 days.

(21) Appl. No.: 13/892,554

(22) Filed: May 13, 2013

(65) Prior Publication Data

US 2013/0329948 A1    Dec. 12, 2013

(30) Foreign Application Priority Data

Jun. 6, 2012  (JP) ................................ 2012-128911

(51) Int. Cl.
*G06K 9/00* (2006.01)
*G06T 7/00* (2017.01)
(Continued)

(52) U.S. Cl.
CPC .............. *G06T 7/004* (2013.01); *G06F 3/017* (2013.01); *G06T 7/20* (2013.01); *G06T 2207/10016* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 2003/0044083 A1* | 3/2003 | Mekata | G06T 7/004 382/282 |
| 2006/0146168 A1* | 7/2006 | Nishi | G06T 5/003 348/333.01 |

(Continued)

FOREIGN PATENT DOCUMENTS

| | | |
|---|---|---|
| JP | 2000-231637 | 8/2000 |
| JP | 2010-74315 | 4/2010 |
| JP | 2011-192090 | 9/2011 |

OTHER PUBLICATIONS

Satoshi Matsuhashi et al. "Human-face extraction using modified HSV color system and personal identification through facial image based on isodensity maps", Canadian Conference on Electrical and Computer Engineering , 1995, pp. 909-912.

(Continued)

*Primary Examiner* — Vikkram Bali
(74) *Attorney, Agent, or Firm* — Oblon, McClelland, Maier & Neustadt, L.L.P.

(57) ABSTRACT

A subject tracking device includes a processor; and a memory which stores a plurality of instructions, which when executed by the processor, cause the processor to execute, detecting at least one subject candidate area in which it is probable that a tracking target subject appears on an image that is received from an imaging unit; calculating a degree of blur of the subject candidate area for each of the subject candidate areas; determining that the subject appears in a subject candidate area having a degree of blur in accordance with a moving speed of the subject, out of the subject candidate areas; and deciding movement of the subject depending on a movement direction from an area in which the subject appears on a previous image that is captured by the imaging unit before capturing the image, to the subject candidate area in which the subject appears on the image.

17 Claims, 10 Drawing Sheets

(51) Int. Cl.
*G06T 7/20* (2017.01)
*G06F 3/01* (2006.01)

(56) References Cited

U.S. PATENT DOCUMENTS

| 2006/0217886 | A1* | 9/2006 | Fujimoto | G06T 7/20 |
| | | | | 701/300 |
| 2011/0222726 | A1 | 9/2011 | Ruan | |
| 2012/0057748 | A1* | 3/2012 | Katano | G06T 7/204 |
| | | | | 382/103 |
| 2012/0121173 | A1* | 5/2012 | Aisaka | G06K 9/00234 |
| | | | | 382/165 |

OTHER PUBLICATIONS

Haralick et al. "Binary Machine Vision", Chapter 2.3 titled Connected Components Labeling, Computer and Robot Vision, Addison-Wesley, 1992 11 pages.

Bernhard E. Boser et al. "A Training Algorithm for Optimal Margin Classifiers", Proceedings of the Fifth Annual ACM Workshop on Computational Learning Theory, Jul. 27-29, 1992, Pittsburgh, Pennsylvania, 17 pages.

* cited by examiner

FIG. 9

| GESTURE | OPERATION |
|---|---|
| RIGHT MOVEMENT | RIGHT SCROLL |
| LEFT MOVEMENT | LEFT SCROLL |
| UPWARD MOVEMENT | UPWARD SCROLL |
| DOWNWARD MOVEMENT | DOWNWARD SCROLL |

900

SUBJECT TRACKING DEVICE AND SUBJECT TRACKING METHOD

CROSS-REFERENCE TO RELATED APPLICATION

This application is based upon and claims the benefit of priority from the prior Japanese Patent Application No. 2012-128911, filed on Jun. 6, 2012, the entire contents of which are incorporated herein by reference.

FIELD

The disclosed technology is related to, for example, a subject tracking device that analyzes a plurality of images arranged in chronological order and tracks an identical subject appearing in the images, a subject tracking method, and a computer readable recording medium to store a subject tracking computer program.

BACKGROUND

In related art, a technology has been proposed that tracks an identical subject that appears in a plurality of images, on the basis of the images that are arranged in chronological order in order to detect an object that moves in monitoring area and identify a gesture.

For example, in Japanese Laid-open Patent Publication No. 2010-74315, a technology is discussed by which a portion area is tracked between the image frames by detecting a portion area that corresponds to a portion area on a current image frame, which is a tracking target on a previous image frame, on the basis of degrees of correlation in portion areas of a plurality of images frames.

In addition, in Japanese Laid-open Patent Publication No. 2011-192090, a gesture recognition device is discussed that recognizes a gesture from a behavior of a recognition target that appears in a video. The gesture recognition device detects a specific subject that appears in a video, calculates a moving speed per unit time of the specific subject, and extracts a movement pattern of the specific subject. In addition, the gesture recognition device identifies the movement of the specific subject as an instruction that is input to the device when the moving speed and the movement pattern satisfy conditions that are defined beforehand.

SUMMARY

According to an aspect of the invention, an apparatus includes a subject tracking device includes a processor; and a memory which stores a plurality of instructions, which when executed by the processor, cause the processor to execute, detecting at least one subject candidate area in which it is probable that a tracking target subject appears on an image that is received from an imaging unit; calculating a degree of blur of the subject candidate area for each of the subject candidate areas; determining that the subject appears in a subject candidate area having a degree of blur in accordance with a moving speed of the subject, out of the subject candidate areas; and deciding movement of the subject depending on a movement direction from an area in which the subject appears on a previous image that is captured by the imaging unit before capturing the image, to the subject candidate area in which the subject appears on the image.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 9 is a diagram illustrating en example of a gesture operation correspondence table.

DESCRIPTION OF EMBODIMENTS

A subject tracking device according to various embodiments is described below with reference to accompanying drawings.

The inventor has newly noted that the picture of a subject on an image is blurred as the moving speed of the subject is high. Therefore, the subject tracking device utilizes a degree of blur of each area in which it is probable that the tracking target subject appears on images that are obtained by capturing the subject for a certain imaging cycle and are arranged in chronological order in order to identify an area in which the subject appears.

In the embodiments, the tracking target subject is a hand of a user, and the subject tracking device decides a gesture that is performed by the user by tracking the movement of the hand of the user.

Figure 1:
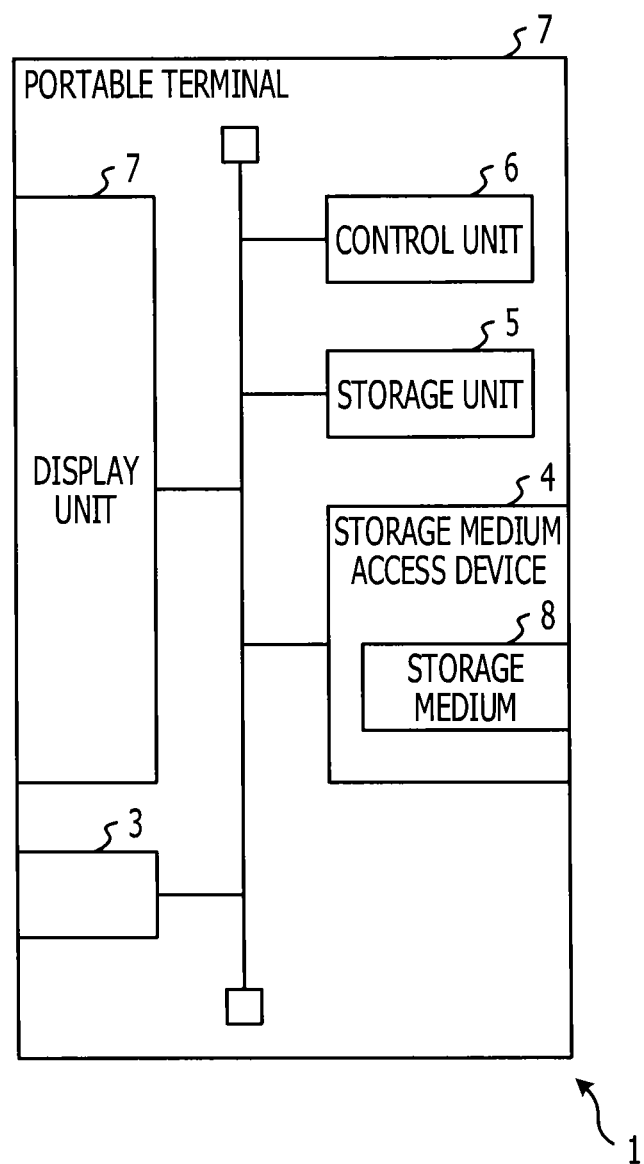
FIG. 1 is a hardware configuration diagram illustrating a portable terminal that is an example of a gesture identification device on which a subject tracking device is installed.

FIG. 1 is a hardware configuration diagram illustrating a portable terminal that is an example of a gesture identification device on which a subject tracking device is installed. A portable terminal 1 includes a display unit 2, an imaging unit 3, a storage medium access device 4, a storage unit 5, and a control unit 6. The display unit 2, the imaging unit 3, the storage medium access device 4, the storage unit 5, and the control unit 6 are arranged in a housing 7. The portable terminal 1 is, for example, a mobile phone, a portable information terminal, or a tablet computer. In addition, the portable terminal 1 may include a communication interface circuit (not illustrated) that is used to connect the portable terminal 1 to another device. FIG. 1 is a diagram illustrating configuration elements that are included in the portable terminal 1, and actual arrangement of the configuration elements of the portable terminal 1 is not limited to the arrangement illustrated in FIG. 1.

The portable terminal 1 detects each image of the hand of the user, which is periodically captured by the imaging unit 3 by analyzing each of the images by the control unit 6, and decides a gesture that is performed by the user by tracking the movement of the hand. In addition, the portable terminal 1 executes processing depending on an operation that corresponds to the gesture that is performed by the user. As a result, the portable terminal 1 allows the user to perform a desired operation for the portable terminal 1, for example, even when it is difficult for the user to touch the portable terminal 1 directly because the hand of the user is wet or the portable terminal 1 is kept out of reach of the user.

The display unit 2 includes, for example, a liquid crystal display, or an organic electroluminescent display, and is arranged so that a display screen of the display unit 2 faces the user who is opposed to the front surface of the housing 7. In addition, the display unit 2 displays various pieces of information for the user. In addition, the display unit 2 may include a touch panel display. In this case, the display unit 2 displays, for example, various icons and operation buttons in response to a control signal from the control unit 6. In addition, when the user touches the position of the displayed icon or operation button, the display unit 2 generates an operation signal depending on the position and outputs the operation signal to the control unit 6.

The imaging unit 3 includes, for example, an image sensor including a solid-state imaging element that is arranged in the form of a two-dimensional array, and an imaging optical system that forms the picture of the subject on the image sensor.

The imaging unit 3 generates, for a certain cycle, an image in which the hand of the user appears, by capturing the picture of the hand of the user for the certain cycle. It is desirable that a shutter speed is fixed in each capturing so that a degree of blur of the picture of the hand of the user is caused mainly by a moving speed of the hand. In addition, in the embodiments, the generated image is a color image that is represented by a RGB color system. In addition, each time an image is generated, the imaging unit 3 outputs the generated image to the control unit 6. The cycle is, for example, 33 ms.

The storage medium access device 4 is, for example, a device that accesses a storage medium 8 such as a magnetic disk or a semiconductor memory card. The storage medium access device 4 reads, for example, a computer program that is executed on the control unit 6 that is stored in the storage medium 8, and passes the computer program to the control unit 6. In addition, as described later, when the control unit 6 executes a computer program that realizes a function as the subject tracking device, the storage medium access device 4 may read a subject tracking computer program from the storage medium 8 and passes the read subject tracking computer program to the control unit 6.

The storage unit 5 includes, for example, a readable and writable nonvolatile semiconductor memory and a readable and writable volatile semiconductor memory. In addition, the storage unit 5 stores various application programs and various pieces of data that are executed on the control unit 6. In addition, the storage unit 5 may store various pieces of data that are used for subject tracking processing. In addition, the storage unit 5 may store a gesture that is indicated by the movement of the hand and a gesture operation correspondence table in which the gesture is associated with an identification code that indicates an operation corresponding to the gesture.

The control unit 6 includes one or more processors and the peripheral circuit. In addition, the control unit 6 is connected to each of the units in the portable terminal 1 through a signal line, and controls the entire portable terminal 1.

In addition, the control unit 6 is an example of a subject tracking device, and the control unit 6 tracks the hand of the user, which is a tracking target subject by analyzing an image each time the image is received from the imaging unit 3, and identifies the movement of the hand of the user on the basis of the tracking result. In addition, the control unit 6 decides a gesture that is performed by the user on the basis of the movement of the hand. In addition, the control unit 6 executes processing that corresponds to the gesture.

Figure 2:
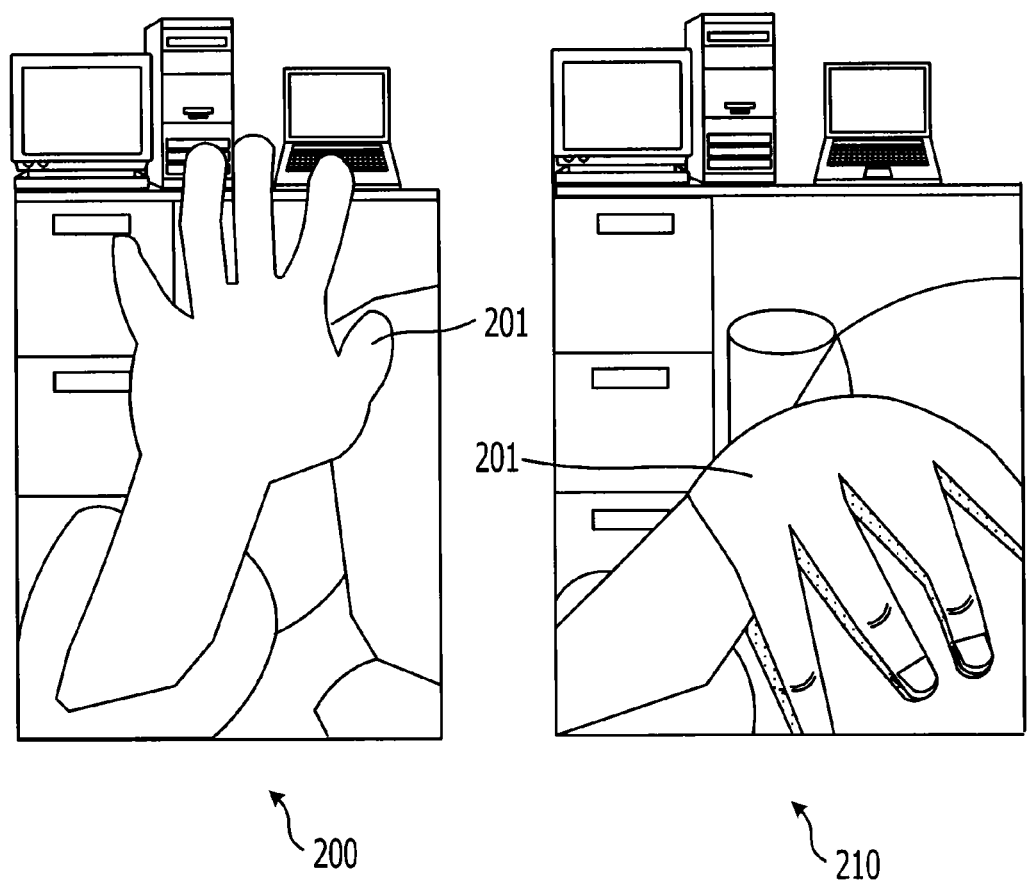
FIG. 2 is a diagram illustrating two images that are obtained by the picture of a hand that is an example of a tracking target subject in a image sequence.

FIG. 2 is a diagram illustrating two images 200 and 210 that are obtained by the picture of a hand that is an example of a tracking target subject in a image sequence. In the image 200, a hand 201 appears in a state in which the palm faces the imaging unit 3 and the fingers face upward. On the other hand, in an image 210, the hand 201 appears in a state in which the fingers face the imaging unit 3. As described above, the shape and position of the hand 201 that appears in the image 200 and the shape and position of the hand 201 in which the image 210 appears are different greatly. Therefore, it is difficult to accurately track the hand 201 on the basis of the shape of the hand 201 and a distance between areas in which the hand 201 appears on the two images or the shapes of the areas in which the hand 201 appears. However, the mere image of the hand 201 is blurred even when the other objects that appear on the images 200 and 210 are not blurred because the hand 201 moves quickly as compared with the other objects.

Therefore, the control unit 6 detects, in each of the images, an area in which pixels having a color that corresponds to the color of the hand are collected as a subject candidate area that is a candidate of an area in which the hand appears and calculates a degree of blur of the subject candidate area. In addition, the control unit 6 determines that the hand of the user appears in a subject candidate area having a degree of blur in accordance with a moving speed of the hand that is assumed when the user performs some sort of gesture.

The subject tracking processing that is executed by the control unit 6 is described below in detail.

Figure 3:
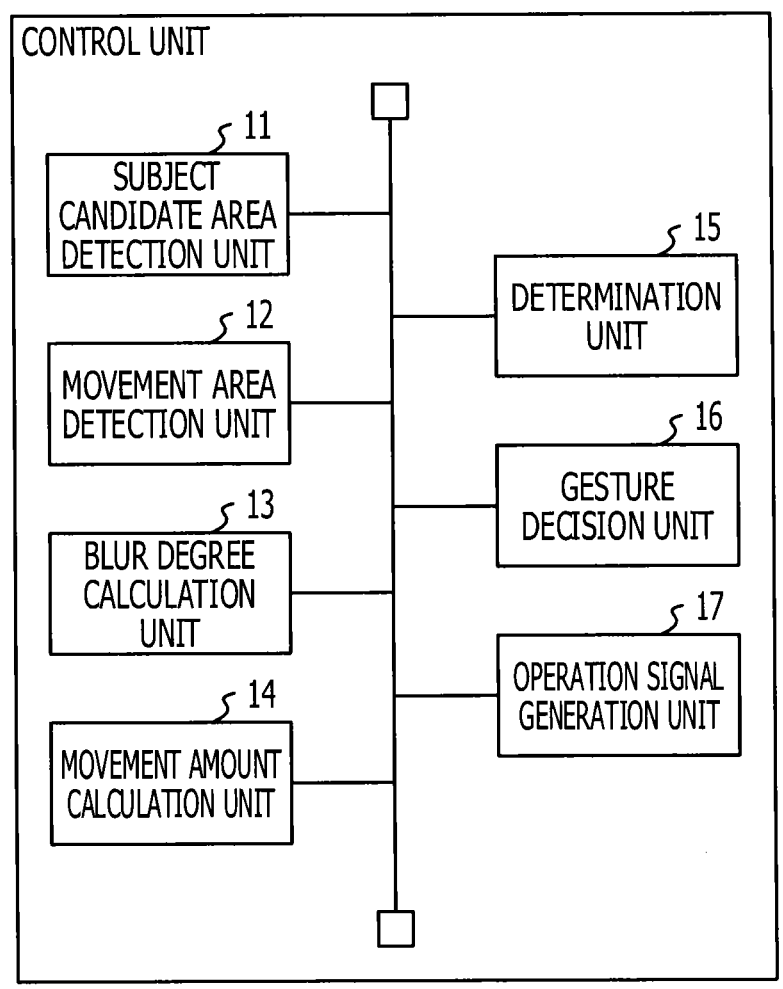
FIG. 3 is a functional block diagram illustrating a control unit that is related to subject tracking processing.

FIG. 3 is a functional block diagram illustrating the control unit 6 that is related to the subject tracking processing. The control unit 6 includes a subject candidate area detection unit 11, a movement area detection unit 12, a blur degree calculation unit 13, a movement amount calculation unit 14, a determination unit 15, a gesture decision unit 16, and an operation signal generation unit 17.

Each of the units that are included in the control unit 6 are installed, for example, as a function module that is realized by a computer program that is executed on a processor included in the control unit 6. Each of the units may be installed in the portable terminal 1 separately from the control unit 6 as a separated circuit, or the units may be installed in the portable terminal 1 separately from the control unit 6 as one integrated circuit that realizes functions of the units.

Each time an image is received from the imaging unit 3, each of the units included in the control unit 6 executes the following processing for the image. Hereinafter, for convenience, a last image received from the imaging unit 3 and is a processing target is referred to as a current image. In addition, an image generated by the imaging unit 3 just before the current image is referred to as a previous image.

The subject candidate area detection unit 11 detects a subject candidate area in which it is probable that the hand of the user appears on the current image. In the embodiment, the subject candidate area detection unit 11 regards collection of pixels having a skin color that corresponds to the color of the hand on the current image as a subject candidate area. Therefore, the subject candidate area detection unit 11 converts a color system of each of the pixels into an HSV color system in accordance with the following formula.

$$V = MAX(R, G, B) \quad (1)$$

$$H = \cos^{-1}\left\{\frac{(G-B)+(G-R)}{2\sqrt{(G-B)^2+(G-R)(B-R)}}\right\}$$

$$S_M = |R\vec{r} + G\vec{g} + B\vec{b}|$$

$$= \sqrt{\left(\frac{(R-G)+(R-B)}{2}\right)^2 + \left(\frac{\sqrt{3}(G-B)}{2}\right)^2}$$

$$\vec{r} = (1, 0)$$

$$\vec{g} = \left(-\frac{1}{2}, \frac{\sqrt{3}}{2}\right)$$

$$\vec{b} = \left(-\frac{1}{2}, \frac{\sqrt{3}}{2}\right)$$

Here, "R", "G", and "B" respectively represent a red component, a green component, and a blue component of the pixel before the conversion. In addition, "MAX" and "MIN" respectively represent a maximum value and a minimum value, out of the red component, the green component, and the blue component of the pixel before the conversion. In addition, "H" and "V" respectively represent hue and brightness of the pixel after the conversion. In addition, "$S_M$" represents correction saturation. The correction saturation has been proposed, for example, by Matsuhashi, et al. "Human-face extraction using modified HSV color system and personal identification through facial image based on isodensity maps", *Proc. Canadian Conference on Electrical and Computer Engineering*, pp. 909-912, 1995.

The subject candidate area detection unit 11 extracts pixels included in a range in which values of hue H and correction saturation $S_M$ correspond to the skin color, out of pixels on the current image, as candidate pixels in which it is probable that the hand appears. The value range for the hue H, which corresponds to the skin color is, for example, 340° to 10°, out of a value range of 0 to 360° for the hue H. In addition, the value range for correction saturation SM, which corresponds to the skin color is, for example, 100 to 200, out of a value range 0 to 255 for the correction saturation SM. In addition, the subject candidate area detection unit 11 generates a skin image in which the candidate pixels have a values '1' and pixels other than the candidate pixels have a value '0', associates the skin image with the current image, stores the associated skin image and current image in the storage unit 5.

The subject candidate area detection unit 11 may convert the color system of the current image into the HSV color system or an HLS color system, and may detect pixels included in a range of values in which the value of hue corresponds to the skin color on the current image after the conversion, as candidate pixels. In addition, when an image that is generated by the imaging unit 3 is initially represented by the HSV color system, the above-described color system conversion processing may be omitted.

The subject candidate area detection unit 11 obtains one or more subject candidate areas by performing labeling processing on the candidate pixels on the skin image, and by integrating collection of a plurality of mutually adjacent candidate pixels into one subject candidate area. The subject candidate area detection unit 11 may delete a subject candidate area in which the number of pixels is less than a certain threshold value. The certain threshold value is set, for example, to an assumed lower limit of the number of pixels included in an area in which the hand appears. In addition, the subject candidate area detection unit 11 may delete a candidate pixel that becomes isolated after performing morphological expansion and contraction calculation on the subject candidate areas. Alternatively, the subject candidate area detection unit 11 integrates a plurality of mutually adjacent subject candidate areas into one subject candidate area by performing the morphological expansion and contraction calculation on the subject candidate areas.

The subject candidate area detection unit 11 assigns a label for each subject candidate area. The label is, for example, a positive integer of one or more and includes a different value for each of the subject candidate areas. For example, a label of "1" to "n" ("n" is a positive integer of one or more) is assigned to each of the subject candidate areas when "n" subject candidate areas are detected for the current image.

The subject candidate area detection unit 11 generates, for pixels included in a subject candidate area, a label image that has the same value as the label of the subject candidate area and is not included in any subject candidate area, that is, a label image in which pixels included in the background have the value of '0'. In addition, the subject candidate area detection unit 11 associates the label image with the current image and stores the associated label image and current image in the storage unit 5.

The movement area detection unit 12 detects an area at least a part of which is not overlapped with a subject candidate area on the previous image, out of the subject candidate areas on the current image. Therefore, the movement area detection unit 12 obtains a difference image between a skin image that corresponds to the current image and a skin image that corresponds to the previous image in accordance with the following formula.

$$D(x, y, t) = \begin{cases} 1 & C(x, y, t) - C(x, y, t-1) > 0 \\ 0 & C(x, y, t) - C(x, y, t-1) \leq 0 \end{cases} \quad (2)$$

Here, C (x, y, t) represents a value of a pixel of a horizontal coordinate "x" and a vertical coordinate "y" in the skin image that corresponds to the current image, C (x, y, t−1) represents a value of a pixel of a horizontal coordinate "x" and a vertical coordinate "y" in the skin image that corresponds to the previous image. In addition, D (x, y, t) represents a value of a pixel of a horizontal coordinate "x" and a vertical coordinate "y" in the difference image that is obtained for the current image. The coordinate in the pixel in each of the images is represented by a coordinate system in which a pixel in the upper left end of the image is an original point (0, 0) and a pixel becomes positive and has a high value as the pixel goes right in the horizontal coordinate "x" while a pixel becomes positive and has a great value as the pixel goes downward in the vertical coordinate "y". Of course, it is permitted that D(x, y, t) is defined as the difference between C(x, y, t) and C(x, y, t−n), where n is possible to take a value over 1 to obtain the difference clearly.

As is clear from the formula (2), it is probable that, in the difference image, in a pixel having the pixel value '1', the subject does not appear on the previous image, and a part of the subject appears on the current image. Therefore, the movement area detection unit 12 obtains one or more difference skin areas by performing the labeling processing on the pixel having the pixel value '1' on the difference image and integrating the plurality of mutually adjacent pixels into one difference skin area. The difference skin area indicates that an object that has moved during a time from the time of capturing of the previous image to the time of capturing of the current image appears. In addition, the movement area detection unit 12 assigns a label for each of the difference skin areas, and generates a difference label image in which a pixel included in a difference skin area has the same value as that of the label of the difference skin area and in which a pixel that is not included in any difference skin area has the pixel value '0'. In addition, the movement area detection unit 12 associates the difference label image with the current image and stores the associated difference label image and the current image in the storage unit 5.

In addition, the movement area detection unit 12 identifies a subject candidate area in which a moving object appears by associating a subject candidate area that is obtained for the current image with a difference skin area. In the embodiment, each of difference skin areas is portion collection of subject candidate areas and is included in any one of the subject candidate areas. Therefore, the movement area detection unit 12 regards a subject candidate area that is overlapped with a difference skin area as a subject candidate area that is corresponds to the difference skin area, with reference to the difference label image and the label image. In addition, the movement area detection unit 12 rewrites a label of the difference skin area to a label of the corresponding subject candidate area.

A plurality of difference skin areas may be overlapped with one subject candidate area. In this case, it is estimated that different portions of the same subject respectively appear in the plurality of difference skin areas. Therefore, the movement area detection unit 12 rewrites a label of any one of the difference skin areas to a label of the subject candidate area that is overlapped with the difference skin area.

Figure 4:
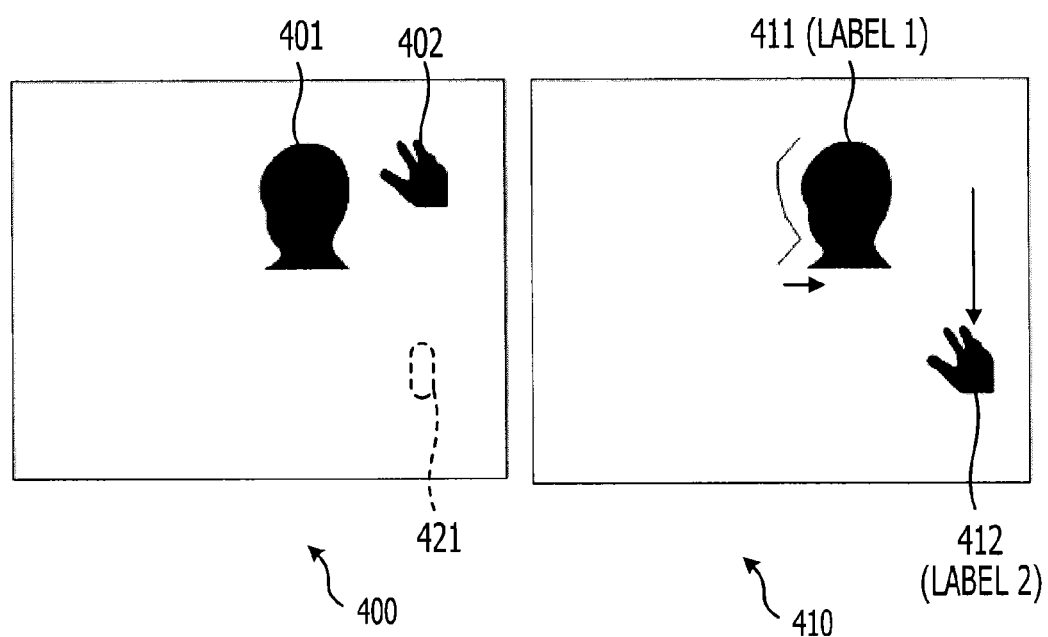
FIG. 4 is a schematic diagram illustrating subject candidate areas that are respectively extracted from two images captured from a image sequence.

FIG. 4 is a schematic diagram illustrating a subject candidate area that is extracted from two images captured from image sequence. In a previous image 400, two subject candidate areas 401 and 402 are detected. Similarly, in a current image 410, two subject candidate areas 411 and 412 are detected. A label '1' is assigned to the subject candidate area 411, and a label '2' is assigned to the subject candidate area 412. In the subject candidate areas 401 and 411, the head of the user appears, and in the subject candidate areas 402 and 412, the hand of the user appears. As compared with the previous image 400, the head of the user is slightly shifted to the right side in the current image 410. On the other hand, the hand of the user is located at the right side of the head in the previous image 400, and the position of the hand of the user on the current image 410 is shifted downward not so as to be overlapped with the position of the hand of the user on the previous image 400.

Figure 5:
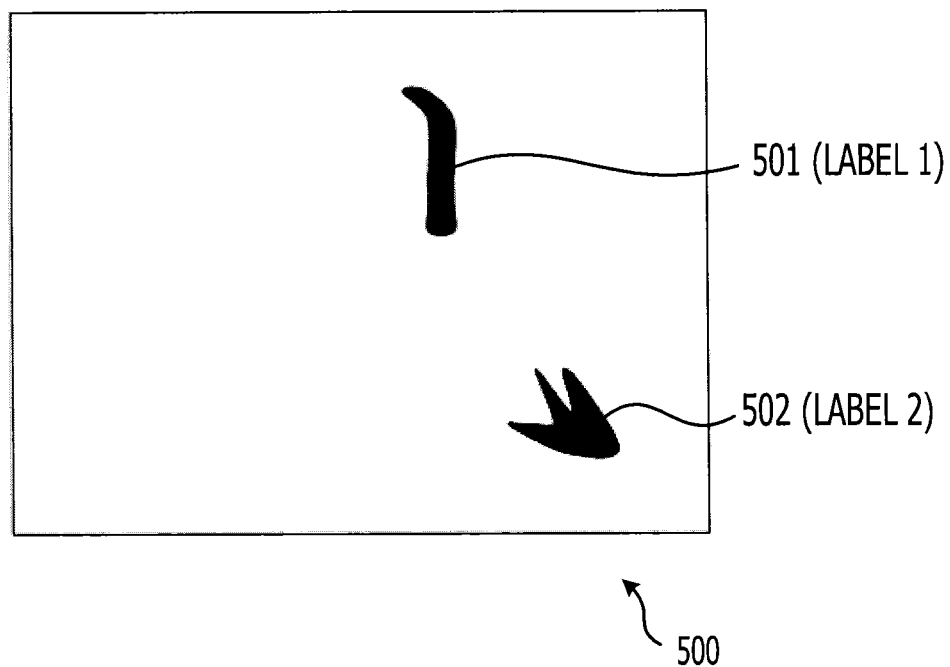
FIG. 5 is a diagram illustrating an example of a difference image that is obtained from the two images illustrated in FIG. 4.

FIG. 5 is a diagram illustrating an example of a difference image that is obtained from the two images illustrated in FIG. 4. As described above, the head of the user is slightly shifted to the right side, and the hand of the user is shifted downward so that the areas in which the hand of the user appears do not overlap between the two images. Therefore, in a difference image 500, a difference skin area 501 that corresponds to a part of the right side of the head of the user and a difference skin area 502 that corresponds to the whole hand of the user are detected. In this case, a label of the difference skin area 501 is rewritten to a label '1' that is assigned to the subject candidate area 411 by the movement area detection unit 12 because the difference skin area 501 is overlapped with the subject candidate area 411. On the other hand, a label of the difference skin area 502 is rewritten to a label 2' that is assigned to the subject candidate area 412 by the movement area detection unit 12 because the difference skin area 502 is overlapped with the subject candidate area 412.

Referring to FIG. 4 again, in the previous image 400 that is illustrated in FIG. 4, it is assumed that, in an area 421 that is indicated by the dotted line and is overlapped with a part of a range in which the hand of the user is located at the time of capturing of the current image 410, an object having the skin color, for example, the other hand of the user is located. In this case, the area 421 is included in subject candidate areas of both of the previous image 400 and the current image 410.

Figure 6:
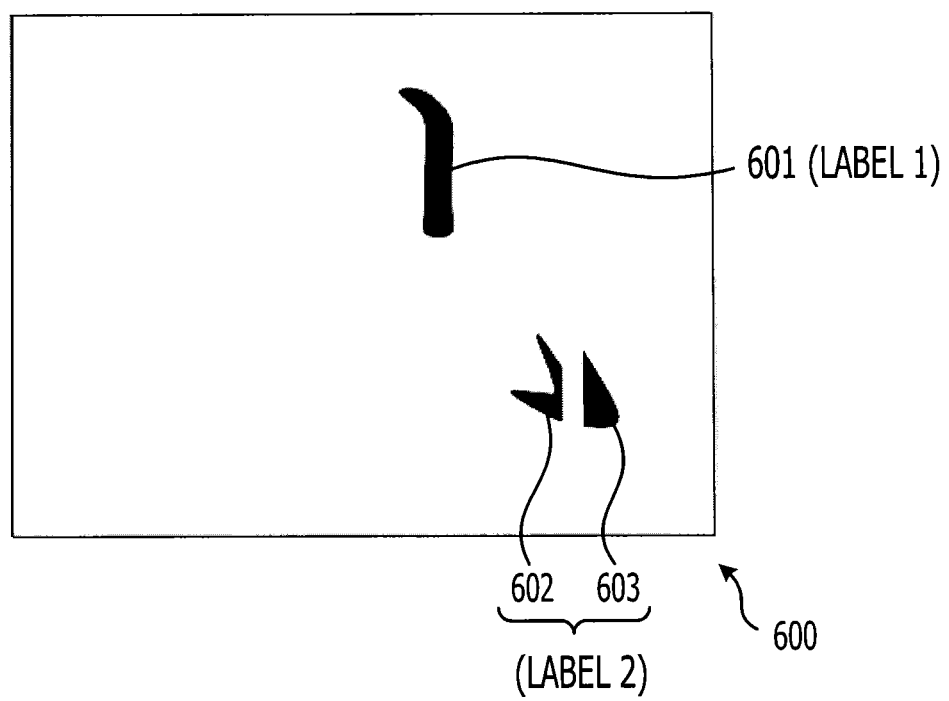
FIG. 6 is a diagram illustrating another example of a difference image that is obtained from the two images illustrated in FIG. 4.

FIG. 6 is a diagram illustrating another example of a difference image that is obtained from the two images illustrated in FIG. 4 in such case. In a difference image 600, a difference skin area 601 that corresponds to a part of the head of the user is obtained. On the other hand, in the difference image 600, as compared with the difference image 500 that is illustrated in FIG. 5, the difference skin area 502 is separated into two difference skin areas 602 and 603 because a portion that corresponds to the area 421 is not included in the difference skin area. Therefore, different labels are assigned to the difference skin areas 601 to 603.

However, both of the difference skin areas 602 and 603 are overlapped with the subject candidate area 412 on the current image. Therefore, both of a label that is assigned to the difference skin area 602 and a label that is assigned to the difference skin area 603 by the movement area detection unit 12 are rewritten to the label '2' that is assigned to the subject candidate area 412.

The movement area detection unit 12 may obtain, for each difference skin area having the same label after the rewriting, the number of pixels included in the difference skin area. In addition, the movement area detection unit 12 may delete a difference skin area by rewriting a pixel value of the difference image included in the difference skin area of which the number of pixels is less than a certain threshold value, to the value '0'. For example, the certain threshold value is set at a value that corresponds to a lower limit of a moving speed of the hand that indicates an assumed gesture, for example, a value that is obtained by multiplying the number of pixels of a subject candidate area that is overlapped with a difference skin area by 0.2. As a result, the control unit 6 may ignore the movement of an object having the skin color, which corresponds to slight movement that is not related to the gesture of the user, thereby reducing the possibility of incorrect tracking for the movement of the hand of the user.

The movement area detection unit 12 calculates, for each difference skin area having the same label after the rewriting, a gravity point of the difference skin area. In addition, the movement area detection unit 12 associates the gravity point of each of the difference skin areas with the difference image and the current image and stores the associated gravity point, difference image, and current image in the storage unit 5.

The blur degree calculation unit 13 calculates a degree of blur for each subject candidate area that is overlapped with the difference skin area that is obtained from the current image. In the embodiment, the blur degree calculation unit 13 calculates edge intensity that is an average value of difference values between pixels of the current image, which are located at the contour of the subject candidate area and pixels that are adjacent to the pixels and included in the background, in accordance with the following formula. In addition, the blur degree calculation unit 13 regards the edge intensity as an index value that indicates a degree of blur.

$$E_j = \frac{1}{3M_j} \sum \Delta \qquad (3)$$

$$\Delta = |r(x, y, t) - r(x', y', t)| + |g(x, y, t) - g(x', y', t)| + |b(x, y, t) - b(x', y', t)|$$

Here, "$E_j$" represents edge intensity for a subject candidate area to which a label "j" is assigned. In addition, r (x, y, t), g (x, y, t), and b (x, y, t) respectively represent a red component value, a green component value, and a blue component value of a pixel p (x, y, t) that is located at the contour of the subject candidate area on the current image. In addition, r (x', y', t), g (x', y', t), and b (x', y', t) respectively represent a red component value, a green component value, and a blue component value of a pixel p (x', y', t) that is adjacent to the pixel p (x, y, t) in the horizontal direction or the vertical direction and is included in the background. In addition, "$M_j$" represent the number of times in which an adjacent pixels difference value $\Delta$ is calculated for the subject candidate area to which the label "j" is assigned. A difference of color components between adjacent pixels becomes small near the edge of the subject candidate area because the picture of an object that appears in the subject candidate area on the image is blurred as the object moves quickly. Therefore, as is clear from the formula (3), a degree of blur becomes high as the edge intensity $E_j$ becomes small.

Figure 7:
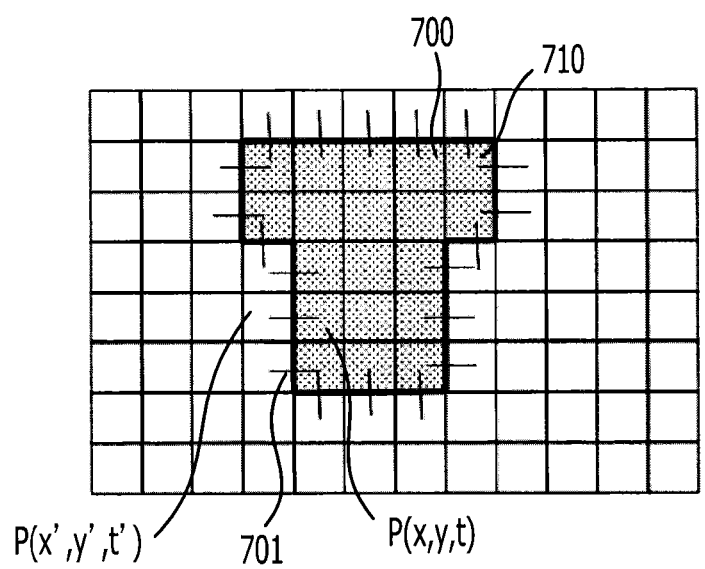
FIG. 7 is a diagram illustrating an example of boundary pixels of a subject candidate area that is utilized for calculation of edge intensity that indicates a degree of blur, and pixels adjacent to the boundary pixels.

FIG. 7 is a diagram illustrating an example of the pixel p (x, y, t) and the pixel p (x', y', t) that are used to calculate edge intensity that indicates a degree of blur. In FIG. 7, an area 700 that is enclosed by a frame border represents one subject candidate area. In this case, between each of the pixels p (x, y, t) that is located at the contour of the subject candidate area 700, and each of the pixels p (x', y', t) that are respectively adjacent to and connected to the pixels p (x, y, t) through a line segment 701, adjacent pixels calculation is performed in accordance with the calculation formula of the adjacent pixels difference value $\Delta$ in the formula (3). As illustrated by the pixel 710 in FIG. 7, for the pixels that are located at the corner of the subject candidate the area 700, adjacent pixels calculation may be performed in each of the horizontal direction and the vertical direction.

According to a modification, the blur degree calculation unit 13 may calculate edge intensity $E_j$ in accordance with the formula (3), merely for a pixel on which the contour of the difference skin area and the contour of the subject candidate area overlap.

The blur degree calculation unit 13 associates edge intensity for each subject candidate area that is overlapped with the difference skin area that is obtained from the current image with the current image and the subject candidate area and stores the associated edge intensity, current image, and subject candidate area in the storage unit 5.

As long as the hand of the user is within a capturing range of the imaging unit 3 at the time of capturing of the current image, the hand of the user, which appears in any one of subject candidate areas on the previous image appears in any one of subject candidate areas on the current image. That is, a movement direction and a movement amount from any one of the subject candidate areas on the previous image to any one of the subject candidate areas on the current image respectively represent a movement direction and a movement amount of the hand of the user. In addition, in the embodiment, a subject candidate area in which the hand of the user that represents some sort of gesture appears is overlapped with a difference skin area because the hand of the user moves when the user performs the gesture. Therefore, the movement amount calculation unit 14 calculates a movement vector and a movement amount between the current image and the previous image for each combination of subject candidate areas in accordance with the following formula.

$$V_{ij}(x_{vij}, y_{vij}) = G_t(j) - G_{t-1}(i) = (x_{tj} - x_{t-1i}, y_{tj} - y_{t-1i})$$

$$H_{ij} = |G_t(j) - G_{t-1}(i)| = \sqrt{(x_{tj} - x_{t-1i})^2 + (y_{tj} - y_{t-1i})^2} \qquad (4)$$

Here, $V_{ij}(x_{vij}, y_{vij})$ represents a movement vector from a gravity point $G_{t-1}(x_{t-1}(i), y_{t-1}(i))$ of a difference skin area that is overlapped with an i-th subject candidate area on the previous image to a gravity point $G_t(x_t(j), y_t(j))$ of a difference skin area that is overlapped with a j-th subject candidate area on the current image. The "$x_{vij}$" and "$y_{vij}$" are a horizontal component and a vertical component of the movement vector, respectively. In addition, "$H_{ij}$" represents a movement vector from a gravity point $G_{t-1}(x_{t-1}(i), y_{t-1}(i))$ of an i-th difference skin area on the previous image to a gravity point $G_t(x_t(j), y_t(j))$ of a j-th difference skin area on the current image.

As long as the control unit 6 executes the subject tracking processing each time an image is received from the imaging unit 3, at the time of executing the subject tracking processing for the current image, a subject candidate area in which the hand of the user, which is a tracking target actually appears on the previous image is already identified. Therefore, even when a plurality of subject candidate areas are detected for the previous image, the movement amount calculation unit 14 may set a combination of a subject candidate area on the current image with a mere subject candidate area in which the hand of the user appears on the previous image.

In addition, it is highly probable that a subject candidate area represents the whole hand of the user, which is a subject, as compared with a difference skin area. Therefore, the movement amount calculation unit 14 may calculate a movement amount and a movement vector by inputting a gravity point of a subject candidate area on the previous image and a gravity point of a subject candidate area on the current image, to the formula (4), instead of gravity points $G_{t-1}(x_{t-1}(i), y_{t-1}(i))$, $G_t(x_t(j), y_t(j))$ of the difference skin area.

The movement amount calculation unit 14 notifies the determination unit 15 of the movement amount and the movement vector of each of the combinations.

Generally, as a moving speed of the subject is high, the picture and contour of the subject on the image are blurred and a movement amount of the subject during a time from the time of capturing of the previous image to the time of capturing of the current image is large. In addition, in the embodiment, a time difference between the time of capturing of the current image and the time of capturing of the previous image is fixed. Therefore, when the hand of the user appears in any one of the above-described combinations, a movement amount from a subject candidate area on the previous image to a subject candidate area on the current image corresponds one-to-one with a moving speed of the hand of the user. Therefore, the determination unit 15 selects a combination in which a degree of blur of the subject candidate area on the current image is a degree of blur that corresponds to the moving speed of the subject in accordance with a capturing time difference between the current image and the previous image and a movement amount for the combination, out of combinations of subject candidate areas. In addition, the determination unit 15 determines that the hand of the user appears in a subject candidate area on the current image, which is included in the selected combination.

In the embodiment, a determination condition to determines that the hand of the user appears in a combination of subject candidate areas between the current image and the previous image is represented by an inequality that defines a relationship between a movement amount $H_{ij}$ and edge intensity $E_j$. The inequality is defined, for example, as represented in the following formula.

$$E_i < \alpha_s H_{ij} + \beta_s \quad (5)$$

Here, "$\alpha_s$" and "$\beta_s$" are coefficients that are used for the inequality, "$\alpha_s$" has a negative value, and "$\beta_s$" has a positive value. In addition, "$H_{ij}$" represents a movement amount from a gravity point $G_{t-1}$ ($x_{t-1}$ (i), $y_{t-1}$ (i)) of an i-th difference skin area on the previous image to a gravity point $G_t$ ($x_t$ (j), $y_t$ (j)) of a j-th difference skin area on the current image.

The number of inequalities to be used may be two or more. In this case, the determination unit 15 determines that a combination that satisfies at least one of inequalities, out of combinations of subject candidate areas satisfies the determination condition.

For example, the determination unit 15 determines whether or not determination conditions by two inequalities in accordance with the formula (5) are satisfied for each combination of subject candidate areas. Values of coefficients "$\alpha_s$" and "$\beta_s$" in each of the two inequalities are, for example, as follows.

$$\alpha_1 = -1, \beta_1 = 70 \quad \text{Inequality 1}$$

$$\alpha_2 = -0.5, \beta_2 = 38 \quad \text{Inequality 2}$$

The values of coefficients "$\alpha_s$" and "$\beta_s$" and the number of inequalities to be used are determined beforehand, for example, on the basis of a set of a movement amount and edge intensity that are calculated on the basis of a plurality of sample images in which the moving hand of the user and another moving object appear.

In addition, the coefficients "$\alpha_s$" and "$\beta_s$" of the inequality may be set for each shutter speed of the imaging unit 3, and stored in the storage unit 5 beforehand. In this case, the determination unit 15 reads the coefficients "$\alpha_s$" and "$\beta_s$" of inequality in accordance with a shutter speed of the imaging unit 3, from the storage unit 5 and utilizes the read coefficients. As a result, even when a shutter speed of the imaging unit 3 is not fixed, the determination unit 15 may accurately evaluate a relationship of edge intensity and a movement amount of the hand of the user.

Figure 8:
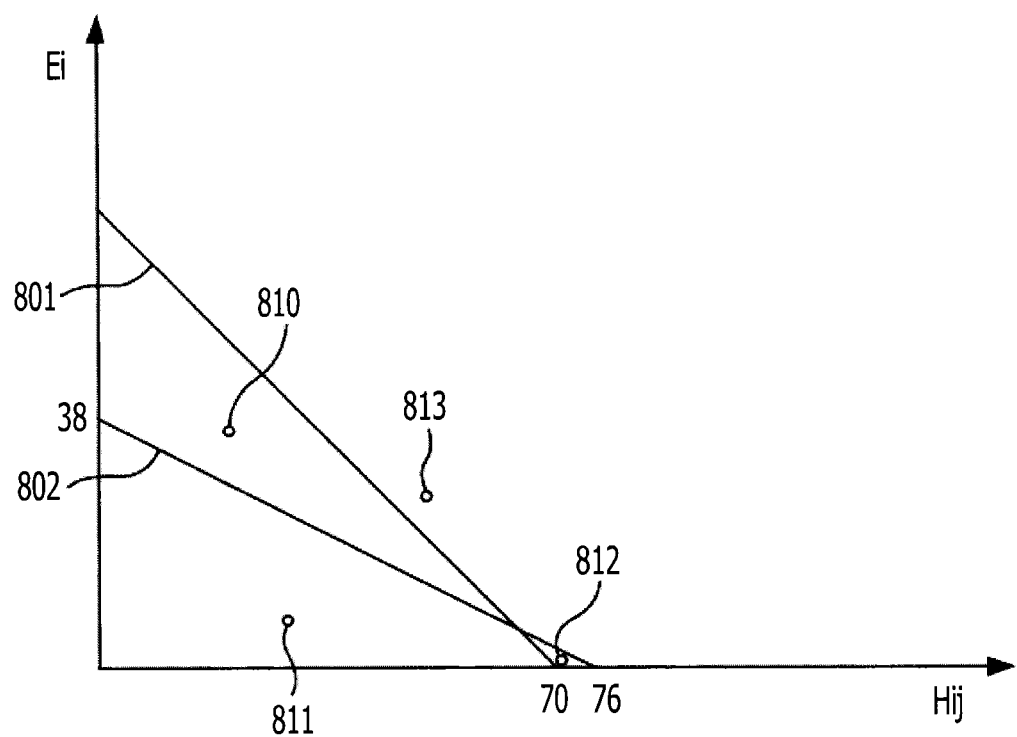
FIG. 8 is a diagram illustrating an example of relationship between an inequality that represents a determination condition, and a set of a movement amount and edge intensity.

FIG. 8 is a diagram illustrating an example of a relationship between an inequality that represents a determination condition, and a set of a movement amount and edge intensity. In FIG. 8, the horizontal axis indicates a movement amount, and the vertical axis indicates edge intensity. A line 801 and a line 802 respectively represent upper limits of edge intensity (that is, lower limits of degrees of blur), which satisfy the above-described inequalities 1 and 2. In this example, sets of a movement amount and edge intensity, which are indicated by dots 810 to 812 satisfies at least one of the inequalities 1 and 2. Therefore, when a combination of a movement amount and edge intensity, which corresponds to a combination of subject candidate areas corresponds to any one of the dots 810 to 812, it is determined that the hand of the user appears in the combination of the subject candidate areas. On the other hand, the set of a movement amount and edge intensity, which is indicated by a dot 813 does not satisfy both of the inequalities 1 and 2. Therefore, it is determined that the hand of the user does not appear in a combination of subject candidate areas, which corresponds to the dot 813.

As described above, the determination unit 15 selects a combination of subject candidate areas, which satisfies the inequalities. In addition, when there is mere one combination, the determination unit 15 determines that the hand of the user appears in each of the subject candidate area on the previous image and the subject candidate area on the current image that are included in the combination. On the other hand, when there are a plurality of combinations of subject candidate areas, each of which satisfies the inequalities, the determination unit 15 may determine a combination in which the hand of the user appears by employing other various tracking methods, for each of the combinations of subject candidate areas, which satisfies the inequalities. For example, the determination unit 15 may estimate, out of the combinations of subject candidate areas, which satisfy the inequalities, a combination in which the sizes of subject candidate areas are most similar, as a combination in which the hand of the user appears.

According to another modification, the determination unit 15 may use one or more inequalities in which upper limits of edge intensity (that is, lower limits of degrees of blur) are indicated by a curve, as determination conditions, instead of the inequality represented by the formula (5). For example, the determination unit 15 may use the following inequality in which an upper limit of edge intensity monotonically decreases, that is, a degree of blur monotonically increases as a movement amount increases, instead of the formula (5).

$$E_i < \psi \exp(-\gamma H_{ij}) \quad (6)$$

Alternatively, the determination unit 15 may use the following inequality instead of the formula (5).

$$E_i < \frac{\xi}{H_{ij}} \quad (7)$$

In the formula (6) and the formula (7), "$\psi$", "$\gamma$", and "$\xi$" are coefficients, respectively.

In addition, according to another modification, the determination unit 15 may use a classifier that regards a movement amount and edge intensity as input and regards a determination result that indicates whether or not the hand of the user appears in a combination of subject candidate areas, which corresponds to the edge intensity and the movement amount, as output, instead of the above-described inequalities. In this case, the determination unit 15 obtains, by performing input of the edge intensity and the movement amount that are related to the combination of subject candidate areas, a determination result that indicates whether or not the hand of the user appears in the subject candidate area on the current image, which is included in the combination. In this case, the classifier may be, for example, a support vector machine, or multilayer perceptron. For example, the classifiers are built beforehand so that the above-described determination condition is represented by an error back-propagation method that is so-called supervised learning. A plurality of parameters that represent the classifier is stored in the storage unit 5 beforehand.

The determination unit 15 associates a subject candidate area in which it is determined the hand of the user appears on the previous image, with a subject candidate area in which it is determined the hand of the user appears on the current image. In addition, the determination unit 15 notifies the gesture decision unit 16 of a movement vector that is obtained for the combination of the two subject candidate areas in which it is determined that the hand of the user appears.

The gesture decision unit 16 is an example of a movement decision unit, and decides the movement of the hand of the user and a gesture that is performed by the user on the basis of a movement vector $V_{ij}$ for the combination of subject candidate areas in which it is determined that the hand of the user appears. For example, it is assumed that a horizontal component $x_{vij}$ of the movement vector $V_{ij}$ is equal to or more than a vertical component $y_{vij}$, and the horizontal component $x_{vij}$ has a positive value. That is, when "($y_{vij}-x_{vij}$)≤0" and "($y_{vij}+x_{vij}$)≥0" are satisfied, the gesture decision unit 16 decides that the user performs a gesture in which the hand is moved in the right direction viewed from the imaging unit 3. In addition, it is assumed that the horizontal component $x_{vij}$ is equal to or more than the vertical component $y_{vij}$, and the horizontal component $x_{vij}$ has a negative value. That is, when "($y_{vij}-x_{vij}$)≥0" and "($y_{vij}+x_{vij}$)≤0" are satisfied, the gesture decision unit 16 decides that the user performs a gesture in which the hand is moved in the left direction viewed from the imaging unit 3.

In addition, it is assumed that the vertical component $y_{vij}$ of the movement vector $V_{ij}$ is more than the horizontal component $x_{vij}$ and the vertical component $y_{vij}$ has a negative value. That is, when "($y_{vij}-x_{vij}$)<0" and "($y_{vij}+x_{vij}$)<0" are satisfied, the gesture decision unit 16 decides that the user performs a gesture in which the hand is moved upward. On the contrary, it is assumed that the vertical component $y_{vij}$ of the movement vector $V_{ij}$ is more than the horizontal component $x_{vij}$ and the vertical component $y_{vij}$ has a positive value. That is, when "($y_{vij}-x_{vij}$)>0" and "($y_{vij}+x_{vij}$)>0" are satisfied, the gesture decision unit 16 decides that the user performs a gesture in which the hand is moved downward.

The gesture decision unit 16 notifies the operation signal generation unit 17 of the movement direction of the hand as a gesture.

According to another modification, the gesture decision unit 16 may decide a combination of a movement direction of the hand of the user and a movement amount of the hand of the user per imaging cycle of the imaging unit 3, as a gesture that is performed by the user. The movement amount of the hand of the user per imaging cycle of the imaging unit 3 is represented by a movement amount for a combination of subject candidate areas in which it is determined that the hand of the user appears.

The operation signal generation unit 17 generates an operation signal depending on a gesture that is performed by the user and identified by the gesture decision unit 16. For example, the operation signal generation unit 17 generates an operation signal depending on the gesture with reference to the gesture operation correspondence table that is stored in the storage unit 5 and indicates correspondence of a gesture and an operation to be executed.

FIG. 9 is a diagram illustrating en example of a gesture operation correspondence table in a case in which a window may be scrolled in a running application in the portable terminal 1. In a gesture operation correspondence table 900, gestures are respectively indicated in fields in the left column, and operations that correspond to the gestures are respectively indicated in fields in the right column. For example, when a gesture is movement of the hand in the right direction, the operation signal generation unit 17 generates an operation signal to causes a window that is being displayed to scroll in the right direction with reference to the gesture operation correspondence table 900. In addition, when a gesture is upward movement of the hand, the operation signal generation unit 17 generates an operation signal to cause the window that is being displayed to scroll upward with reference to the gesture operation correspondence table 900.

An operation that corresponds to a gesture is not limited to scroll of a window. For example, when a plurality of icons are displayed on a display screen of the display unit 2 so as to be arranged two-dimensionally, the movement of the hand in each direction may correspond to an operation to cause a selected icon to shift along the direction.

In addition, when a gesture is determined on the basis of a movement direction and a movement amount, the operation signal generation unit 17 may identify an operation depending on a combination of the movement direction and the movement amount. For example, when the hand moves downward and the movement amount is less than a certain threshold value, the operation signal generation unit 17 generates an operation signal to cause the window to scroll downward, similarly to the above-described embodiment. On the other hand, when the hand moves downward and the movement amount is the threshold value or more, the operation signal generation unit 17 may generate an operation signal to cause a running application to terminate.

The operation signal generation unit 17 passes the generated operation signal to the control unit 6. In addition, the control unit 6 executes processing in response to the operation signal.

Figure 10:
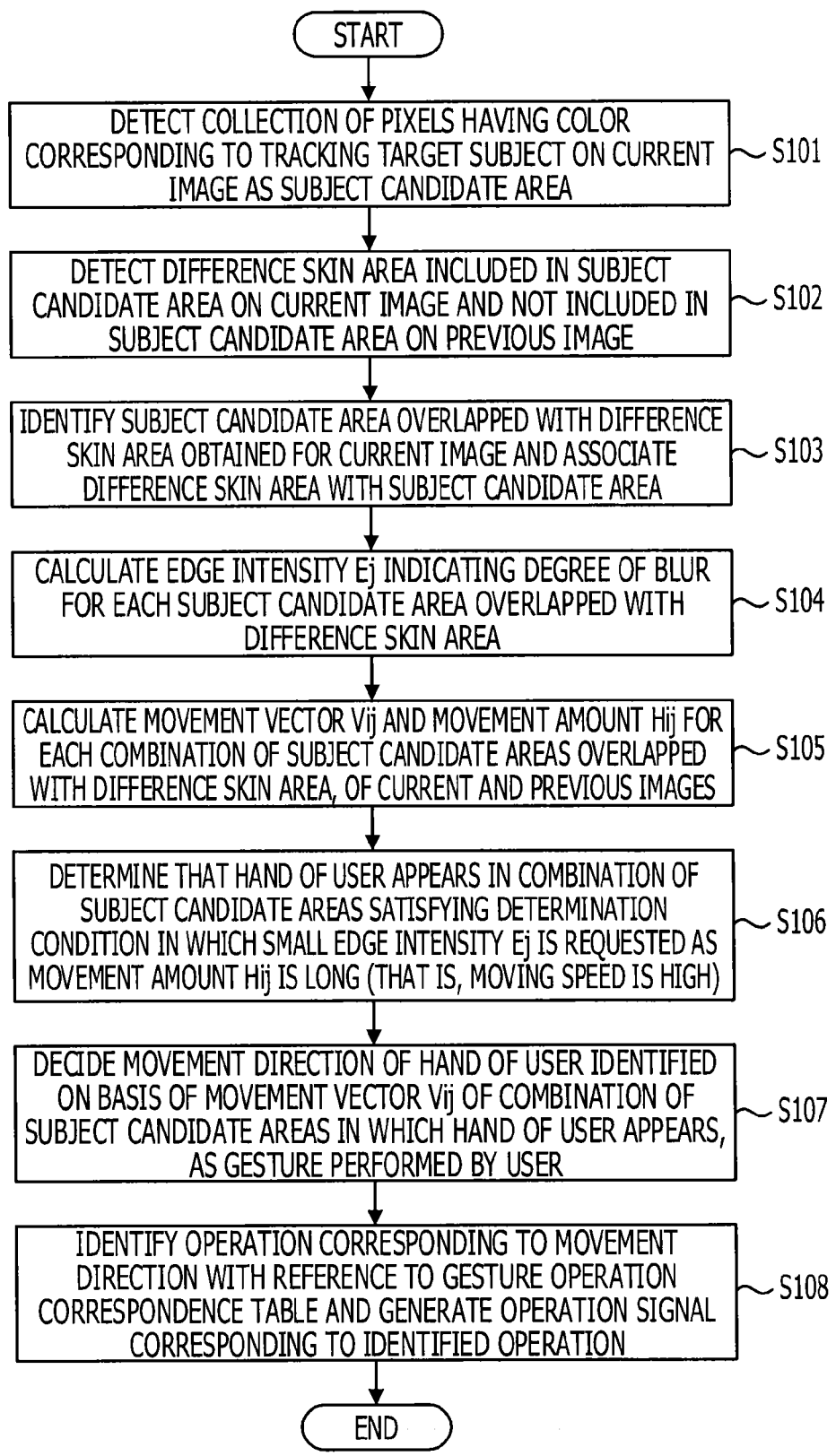
FIG. 10 is a flowchart illustrating an operation of the subject tracking processing.

FIG. 10 is a flowchart illustrating an operation of the subject tracking processing that is executed by the control unit 6. The control unit 6 executes the subject tracking processing each time an image is received from the control unit 6 from the imaging unit 3.

The subject candidate area detection unit 11 detects collection of pixels having a color that corresponds to that of the subject on the current image as a subject candidate area and assigns a label to each of the subject candidate areas (Step S101). In addition, the subject candidate area detection unit 11 generates a skin image that indicates each of the detected subject candidate areas and a label image that indicates a label of each of the subject candidate areas, associates the skin image and label image with the current image, and stores the associated images in the storage unit 5.

The movement area detection unit 12 detects a difference skin area that is included in a subject candidate area on the current image and that is not included in the subject candidate area on the previous image by obtaining a difference image between a skin image that corresponds to the current image and a skin image that corresponds to the previous image (Step S102). In addition, the movement area detection unit 12 generates a difference label image that indicates the difference skin area, associates the difference label image with the current image, and stores the associated images in the storage unit 5.

The movement area detection unit 12 further identifies a subject candidate area that is overlapped with the difference skin area that is obtained for the current image, associates the difference skin with and the subject candidate area, and calculates a gravity point of the difference skin area (Step S103). In addition, the movement area detection unit 12 assigns, for each of the subject candidate areas, the same label to a difference skin area that is overlapped with the subject candidate area, associates the label and a gravity point of the difference skin area to which the same label is assigned, with the current image, and stores the associated label, gravity point, and image in the storage unit 5.

The blur degree calculation unit 13 calculates edge intensity $E_j$ that indicates a degree of blur for each of the subject candidate areas that are overlapped with the difference skin area that is obtained for the current image (Step S104). In addition, the blur degree calculation unit 13 associates the subject candidate area and the difference skin area with the edge intensity and stores the associated areas and edge intensity in the storage unit 5.

The movement amount calculation unit 14 calculates a movement vector $V_{ij}$ and a movement amount $H_{ij}$ for each combination of the subject candidate areas each of which is overlapped with the difference skin area between the current image and the previous image (Step S105). In addition, the movement amount calculation unit 14 notifies the determination unit 15 of the movement vector $V_{ij}$ and the movement amount $H_{ij}$ of each of the combinations with a label of each of the difference skin areas included in the combination.

The determination unit 15 determines that the hand of the user appears in a combination that satisfies a determination condition in which small edge intensity $E_j$, that is, a high degree of blur is requested as the movement amount $H_{ij}$ is long (that is, the moving speed is high), out of the combinations of subject candidate areas (Step S106). In addition, the determination unit 15 notifies the gesture decision unit 16 of a movement vector $V_{ij}$ of the selected combination.

The gesture decision unit 16 decides a movement direction of the hand of the user, which is identified on the basis of the movement vector $V_{ij}$ of the combination of subject candidate areas in which the hand of the user appears, as a gesture that is performed by the user (Step S107). In addition, the gesture decision unit 16 notifies the operation signal generation unit 17 of the movement direction.

With reference to the gesture operation correspondence table that indicates correspondence between a movement direction of the hand of the user and an operation to be executed, the operation signal generation unit 17 identifies an operation that corresponds to the movement direction, and generates an operation signal that corresponds to the identified operation (Step S108). In addition, the operation signal generation unit 17 passes the operation signal to the control unit 6. After that, the control unit 6 terminates the subject tracking processing.

The control unit 6 may change the order of the processing in Step S104 and the processing in Step S105. In addition, the control unit 6 may obtain edge intensity of all subject candidate areas. In this case, the control unit 6 may change the order of the processing in Steps S102 and S103 and the processing in Step S104.

As described above, the subject tracking device according to the embodiment identifies a subject candidate area in which a tracking target subject appears using a degree of blur of the subject candidate area, which varies depending on a moving speed of the subject. In addition, the degree of blur is not affected by change in the shape and the orientation of the tracking target subject, of the current and previous images. Therefore, the subject tracking device may track the subject even when the shape and the orientation of the tracking target subject varies with time.

According to another modification, the movement amount calculation unit 14 may calculate, for all combinations of subject candidate areas on the current image and subject candidate areas on the previous image, a movement vector and a movement amount between gravity points of subject candidate areas of the combination. In addition, the determination unit 15 may determine whether or not a determination condition to determine whether or not the hand of the user appears is satisfied for all of the combinations. In this case, a combination including a subject candidate area in which the subject that does not move during a time from the time of capturing of the previous image to the time of capturing of the current image appears is also included in a calculation target for a movement vector and a movement amount, however, processing of the movement area detection unit 12 may be omitted.

In addition, according to another modification, the movement amount calculation unit 14 may set a mere combination of a subject candidate area that is detected on the previous image and a subject candidate area having the closest degree of blur on the current image to the degree of blur of the subject candidate area on the previous image. In the modification, when it is assumes that the subject that performs a gesture performs substantially uniform motion, the movement amount calculation unit 14 may reduce the number of combinations of subject candidate area.

In addition, according to another modification, the determination unit 15 may identify a subject candidate area in which the tracking target subject appears on the basis of a degree of blur of the subject candidate area that is detected on the current image without using an image that has been captured before the current image. For example, the determination unit 15 may determine that the subject is appears in a subject candidate area having a degree of blur in accordance with a moving speed that is assumed for the tracking target subject, out of subject candidate areas on the current image.

For example, in accordance with any one of the formula (5) to the formula (7), for a gesture to be recognized, an upper limit Thmax of edge intensity and a lower limit Thmin of edge intensity that correspond to an assumed value of a moving speed of the hand that is the tracking target subject are set beforehand. For example, a lower limit of a movement amount is '25' when the formula (5) and the values of the above-described coefficients "$\alpha_s$" and "$\beta_s$" are used, and "the upper limit Thmax of edge intensity=45" and "the lower limit Thmin of edge intensity=10" are satisfied when an upper limit of a movement amount is '60'.

The determination unit 15 selects a subject candidate area having edge intensity that is included in a range from the above-described lower limit Thmin of edge intensity to the upper limit Thmax of edge intensity, from subject candidate areas on the current image. When there is the mere one selected subject candidate area, the determination unit 15 determines that the tracking target subject appears in the subject candidate area. On the other hand, there may be the plurality of selected subject candidate areas. In this case, the determination unit 15 determines that the subject appears in the selected subject candidate area in which a movement amount from the subject candidate area in which the tracking target subject appears on the previous image is included in a range of a movement amount, which corresponds to the lower limit Thmin of edge intensity to the upper limit Thmax of edge intensity, out of the plurality of selected subject candidate areas.

In addition, according to another modification, the subject candidate area detection unit 11 may detect a subject candidate area on the basis of information that indicates the subject feature that is independent of the shape and moving speed of the tracking target subject and that is other than color information. For example, the subject candidate area detection unit 11 divides the current image into a plurality of portion areas and calculates a texture information value of the tracking target subject for each of the portion areas. In addition, the subject candidate area detection unit 11 may detect a portion area as a subject candidate area when the texture information value is a value that corresponds to a texture information value included in an area in which the tracking target subject appears. As the texture information value, for example, a value such as contrast, entropy, or variance, which is obtained from a concentration co-occurrence matrix for a portion area may be employed. Alternatively, the subject candidate area detection unit 11 may calculate a fractal dimension for each of the portion areas and detect a portion area as a subject candidate area when the fractal dimension is a value that corresponds to a fractal dimension included in an area in which the tracking target subject appears. In this example, the subject candidate area detection unit 11 may execute the labeling processing on the portion area that is detected as a subject candidate area and connect adjacent subject candidate areas each other.

In addition, when the tracking target subject is an object in which a structure having a high shading difference such as the face of the user, the blur degree calculation unit 13 may calculate absolute value average of difference values of brightness between adjacent pixels in a subject candidate area, as an index that indicates a degree of blur.

In addition, the subject tracking device according to the embodiments or the modifications may be installed on various devices other than the portable terminal, for example, a monitoring device that monitors a moving object that passes through a certain area or a moving object that enters the certain area. For example, such monitoring device is installed so as to track a vehicle that passes through an intersection that is an example of the certain area. In such case, in the vehicle that turns the intersection, the orientation for an imaging unit included in the monitoring device varies with time, so that the shape of the picture of the vehicle on an image that is generated by the imaging unit also varies with time. However, as described above, the subject tracking device according to the embodiments or the modifications identifies, in accordance with a degree of blur of a subject candidate area, which is independent of the shape and the orientation of the subject, a subject candidate area in which the same vehicle appears for a plurality of images that are arranged in chronological order. Therefore, the subject tracking device may accurately track even such vehicle the orientation for the imaging unit of which varies with time.

In addition, a computer program that causes a computer to execute each function that is related to the subject tracking processing according to the above-described embodiments or modifications may be provided so as to be recorded in a medium that is readable by the computer, such as a magnetic recording medium or an optical recording medium. However, a carrier wave is not included in the medium that is readable by the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A subject tracking device comprising:
    a processor; and
    a memory which stores a plurality of instructions, which when executed by the processor, cause the processor to:
        detect at least one subject candidate area in which it is probable that a tracking target subject appears on a first image that is captured by an imaging device, the tracking target subject having been detected in a second image captured by the imaging device before the first image;
        calculate a degree of motion blur for each of the at least one subject candidate area, wherein each of the calculated degree of motion blur is represented as an index value;
        determine a tracking target area in which the tracking target subject appears among from the at least one subject candidate area based on a difference of position between the at least one subject candidate area in the first image and a position of the tracking target subject in the second image and based on a moving speed determined in accordance with the calculated degree of motion blur; and
        decide a movement of the tracking target subject depending on a movement direction from an area in which the tracking target subject appears on the second image to the determined tracking target area.

2. The subject tracking device according to claim 1, wherein the calculated degree of motion blur of the one of the at least one subject candidate area has a highest decision value from among the calculated degree of motion blur of a remaining of the at least one subject candidate area.

3. The subject tracking device according to claim 1, wherein the processor is further configured to:
    calculate a movement amount by setting at least one combination based on the one of the at least one subject candidate area on the first image and the area that is detected on the second image, and by calculating a distance between of the one of the at least one subject candidate area on the first image and the area on the second image,
    wherein the moving speed of the tracking target subject is further based on the distance and a difference between a capturing timing of the first image and a capturing timing of the second image.

4. The subject tracking device according to claim 3, wherein the processor is further configured to:

detect each of the at least one subject candidate area in which at least a part of which is not overlapped with the area on the second image.

5. The subject tracking device according to claim 4, wherein when a plurality of subject candidate areas are detected on the first image and a plurality of combinations are set, the processor is configured to select a combination from the plurality of combinations that has a closest calculated degree of motion blur to that of the area detected on the second image.

6. The subject tracking device according to claim 1, wherein in the detecting of the at least one subject candidate area, collection of pixels having color information that corresponds to the tracking target subject on the first image is detected as the at least one subject candidate area.

7. The subject tracking device according to claim 1, wherein in the detecting of the at least one subject candidate area, the first image is divided into a plurality of portion areas, and a portion area having texture information that corresponds to the tracking target subject is detected out of the plurality of portion areas, as the at least one subject candidate area.

8. The subject tracking device according to claim 1, wherein the processor is further configured to calculate an edge intensity of a contour of each of the at least one subject candidate area as the index value.

9. A subject tracking method comprising:
detecting at least one subject candidate area in which it is probable that a tracking target subject appears on a first image that is captured by an imaging device, the tracking target subject having been detected in a second image captured by the imaging device before the first device;
calculating, by a computer processor, a degree of motion blur for each of the at least one subject candidate area, wherein each of the calculated degree of motion blur is represented as an index value;
determining a tracking target area in which the tracking target subject appears among from the at least one subject candidate area based on a difference of position between the at least one subject candidate area in the first image and a position of the tracking target subject in the second image and based on a moving speed determined in accordance with the calculated degree of motion blur; and
deciding a movement of the tracking target subject depending on a movement direction from an area in which the tracking target subject appears on the second image to the determined tracking target area.

10. The subject tracking method according to claim 9, wherein the calculated degree of motion blur of the one of the at least one subject candidate area has a highest decision value from among the calculated degree of motion blur of a remaining of the least one subject candidate area.

11. The subject tracking method according to claim 9, further comprising:
calculating a movement amount by setting at least one combination based on the one of the at least one subject candidate area on the first image and the area that is detected on the second image, and by calculating a distance between of the one of the at least one subject candidate area on the first image and the area on the second image,
wherein the moving speed of the tracking target subject is further based on the distance and a difference between a capturing timing of the first image and a capturing timing of the second image.

12. The subject tracking method according to claim 11, further comprising:
detecting each of the at least one subject candidate area in which at least a part of which is not overlapped with the area on the second image.

13. The subject tracking method according to claim 12, further comprising:
when a plurality of subject candidate areas are detected on the first image and a plurality of combinations are set, selecting a combination from the plurality of combinations that has a closest degree of motion blur to that of the area detected on the second image.

14. The subject tracking method according to claim 9, further comprising:
collecting of pixels having color information that corresponds to the tracking target subject on the first image is detected as the at least one subject candidate area.

15. The subject tracking method according to claim 9, further comprising:
dividing the first image into a plurality of portion areas, detecting a portion area having texture information that corresponds to the tracking target subject out of the plurality of portion areas, as the at least one subject candidate area.

16. The subject tracking method according to claim 9, further comprising:
calculating an edge intensity of a contour of each of the at least one subject candidate area as the index value.

17. A non-transitory computer-readable storage medium storing a subject tracking computer program that causes a computer to execute a process comprising:
detecting at least one subject candidate area in which it is probable that a tracking target subject appears on a first image that is captured by an imaging device, the tracking target subject having been detected in a second image captured by the imaging device before the first image;
calculating a degree of motion blur for each of the at least one subject candidate area, wherein each of the calculated degree of motion blur is represented as an index value;
determining a tracking target area in which the tracking target subject appears among from the at least one subject candidate area based on a difference of position between the at least one subject candidate area in the first image and a position of the tracking target subject in the second image and based on a moving speed determined in accordance with the calculated degree of motion blur; and
deciding a movement of the tracking target subject depending on a movement direction from an area in which the tracking target subject appears on the second image to the determined tracking target area.

* * * * *